United States Patent
Dai et al.

(10) Patent No.: US 11,966,751 B2
(45) Date of Patent: Apr. 23, 2024

(54) DEVICE AND BOOTING METHOD OF THE DEVICE

(71) Applicant: SAMSUNG ELECTRONICS CO., LTD., Suwon-si (KR)

(72) Inventors: Yuehua Dai, Xi'an (CN); Xiangming Yang, Xi'an (CN); Tianjie Zhao, Xi'an (CN); Mindong Zhao, Xi'an (CN)

(73) Assignee: Samsung Electronics Co., Ltd. (KR)

( * ) Notice: Subject to any disclaimer, the term of this patent is extended or adjusted under 35 U.S.C. 154(b) by 207 days.

(21) Appl. No.: 17/357,629

(22) Filed: Jun. 24, 2021

(65) Prior Publication Data

US 2022/0334847 A1    Oct. 20, 2022

(30) Foreign Application Priority Data

Apr. 16, 2021   (CN) .......................... 202110413312.5

(51) Int. Cl.
*G06F 1/24* (2006.01)
*G06F 9/4401* (2018.01)
*G06F 9/455* (2018.01)
*G06F 9/48* (2006.01)
*G06F 9/50* (2006.01)

(52) U.S. Cl.
CPC ........ *G06F 9/4406* (2013.01); *G06F 9/45533* (2013.01); *G06F 9/4881* (2013.01); *G06F 9/5038* (2013.01); *G06F 9/4401* (2013.01)

(58) Field of Classification Search
CPC .. G06F 9/4406; G06F 9/45533; G06F 9/4881; G06F 9/5038; G06F 9/5027; G06F 2009/4557; G06F 2009/45583; G06F 9/45558; G06F 9/3877

USPC ............................................................ 713/2
See application file for complete search history.

(56) References Cited

U.S. PATENT DOCUMENTS

| | | | |
|---|---|---|---|
| 5,642,506 A * | 6/1997 | Lee ........................ | G06F 9/4405 713/1 |
| 6,298,370 B1 * | 10/2001 | Tang ........................ | G06F 9/505 718/100 |
| 8,756,417 B1 * | 6/2014 | Gardner ................ | G06F 21/575 709/224 |
| 9,354,896 B1 * | 5/2016 | Yang ...................... | G06F 9/4401 |
| 9,886,303 B2 | 2/2018 | Koller Jemio et al. | |
| 9,898,304 B2 | 2/2018 | Powell et al. | |
| 2003/0131225 A1 * | 7/2003 | Bradley ................ | G06F 9/4405 713/2 |
| 2006/0168435 A1 * | 7/2006 | Svensson .............. | G06F 9/4405 713/1 |

(Continued)

*Primary Examiner* — Volvick Derose
(74) *Attorney, Agent, or Firm* — Fish & Richardson P.C.

(57) ABSTRACT

A device is deployed with a preset operating system. A booting method of the device includes: performing, by a main processor, at least one first kernel task of a kernel of the preset operating system in a preset initialization phase of the kernel of the preset operating system; and distributing at least one second kernel task of the kernel of the preset operating system to at least one secondary processor for processing. The boot processor and the secondary processor are both processors of the device. The boot processor boots the preset operating system. Tasks of the kernel of the preset operating system in the preset initialization phase are divided into the at least one first kernel task and the at least one second kernel task.

18 Claims, 4 Drawing Sheets

(56) References Cited

U.S. PATENT DOCUMENTS

| | | | |
|---|---|---|---|
| 2008/0077786 A1* | 3/2008 | Pierce | G06F 9/4405 713/2 |
| 2008/0301408 A1* | 12/2008 | Kranich | G06F 9/3012 712/E9.023 |
| 2014/0089731 A1* | 3/2014 | Lee | G06F 11/2028 714/10 |
| 2014/0229724 A1* | 8/2014 | Chen | G06F 9/4406 713/2 |
| 2014/0359267 A1* | 12/2014 | Moriki | G06F 9/4405 713/2 |
| 2015/0026678 A1* | 1/2015 | Imada | G06F 9/45533 718/1 |
| 2015/0106822 A1* | 4/2015 | Lei | G06F 9/5005 718/104 |
| 2015/0120979 A1* | 4/2015 | Imada | G06F 13/24 710/269 |
| 2016/0004540 A1* | 1/2016 | Powell | G06F 9/4401 713/2 |
| 2017/0031692 A1* | 2/2017 | Oh | G06F 21/604 |
| 2017/0185771 A1* | 6/2017 | Sun | H04L 63/1425 |
| 2017/0351623 A1* | 12/2017 | Araki | G06F 9/48 |
| 2018/0349608 A1* | 12/2018 | de Cesare | G06F 21/575 |
| 2019/0286496 A1* | 9/2019 | Li | G06F 9/52 |
| 2019/0310859 A1* | 10/2019 | Kopfstedt | G06F 9/4401 |
| 2019/0332425 A1* | 10/2019 | Narayana | G06F 9/3851 |
| 2019/0361710 A1* | 11/2019 | Hupfer | G06F 9/4406 |
| 2020/0019695 A1* | 1/2020 | Sovio | G06F 21/602 |
| 2020/0117514 A1* | 4/2020 | Yu | G06F 9/5044 |
| 2020/0151049 A1 | 5/2020 | Sutton et al. | |
| 2021/0012588 A1* | 1/2021 | Kwon | G07C 5/008 |
| 2021/0089478 A1* | 3/2021 | Takeda | G06F 12/1009 |
| 2022/0012845 A1* | 1/2022 | Liu | G06T 1/0007 |
| 2022/0129327 A1* | 4/2022 | Kashtan | G06F 9/4881 |
| 2022/0334847 A1* | 10/2022 | Dai | G06F 9/4881 |

\* cited by examiner

DEVICE AND BOOTING METHOD OF THE DEVICE

CROSS-REFERENCE TO RELATED APPLICATION

This U.S. nonprovisional patent application is based on and claims priority under 35 U.S.C. § 119 to Chinese Patent Application No. 202110413312.5, filed on Apr. 16, 2021 in the Chinese Patent Office, the disclosure of which is incorporated by reference herein in its entirety.

TECHNICAL FIELD

The present disclosure relates to device booting optimization. In particular, the present disclosure relates to a device and an optimized booting method of the device.

BACKGROUND ART

For some applications that are time-critical, it is vital to get devices that run the applications to be booted quickly. For example, in the automotive field, cars are generally equipped with rear view camera (RVC) devices. When a driver presses a booting button of the rear view camera, he driver usually expects that the rear view camera can quickly be booted to enter a working state, so as to ensure driving safety. In addition, quickly booting the device may also significantly improve the user experience.

Booting a device quickly requires that an operating system of the device is quickly booted. Generally, a booting process of a kernel of an operating system includes a single-core initialization phase and a multi-core initialization phase. In related technologies, some optimization schemes are used to accelerate the booting process of the multi-core initialization phase of the operating system, thereby achieving the purpose of shortening booting time of the device. However, the optimization schemes in the related technologies do not realize the optimization for the single-core initialization phase. That is, optimization for the single-core initialization phase is neglected, which adversely impacts the booting time of the device. For example, in the single-core initialization phase of the kernel of the operating system, only the boot processor is in a working state to boot a preset operating system, and the other processors are in a non-working state.

SUMMARY

The exemplary embodiments of the present disclosure may address the above-described problems.

According to one aspect of the disclosure, a booting method of a device deployed with a preset operating system includes: performing, by a main processor, at least one first kernel task of a kernel of the preset operating system in a preset initialization phase of the kernel of the preset operating system; and distributing at least one second kernel task of the kernel of the preset operating system to at least one secondary processor for processing. The main processor and the secondary processor are both processors of the device. The main processor boots the preset operating system. Tasks of the kernel of the preset operating system in the preset initialization phase are divided into the at least one first kernel task and the at least one second kernel task.

According to another aspect of the disclosure, a device deployed with a preset operating system includes a boot processor and at least one secondary processor. The boot processor is configured to: boot the preset operating system, perform at least one first kernel task of a kernel of the preset operating system in a preset initialization phase of the kernel of the preset operating system, and distribute at least one second kernel task of the kernel of the preset operating system to at least one secondary processor for processing. Tasks of the kernel of the preset operating system in the preset initialization phase are divided into the at least one first kernel task and the at least one second kernel task.

According to another aspect of the disclosure, a computer-readable storage medium stores instructions. The instructions, when executed by a boot processor of a device with a preset operating system, cause the boot processor to: perform at least one first kernel task of a kernel of the preset operating system in a preset initialization phase of the kernel of the preset operating system; and distribute at least one second kernel task of the kernel of the preset operating system to at least one secondary processor for processing. The boot processor and the secondary processor are both processors of the device. The boot processor boots the preset operating system. Tasks of the kernel of the preset operating system in the preset initialization phase are divided into the at least one first kernel task and the at least one second kernel task.

According to the device and the booting method of the device provided by the present disclosure, the kernel tasks of the preset initialization phase of the kernel of the preset operating system are divided into the first kernel task performed by the boot processor and the second kernel task performed by the secondary processor. The boot processor and the at least one secondary processor may perform multiple kernel tasks in the preset initialization phase in parallel, which shortens the time of the preset initialization phase and speeds up the booting process of the kernel of the operating system. Accordingly, the booting time of the device is further shortened, so that the device may be booted more quickly.

BRIEF DESCRIPTION OF THE DRAWINGS

The detailed description of the disclosure will be given below in conjunction with the accompanying drawings. The above features and other objectives, characteristics and advantages of the disclosure will become clearer, in which.

DETAILED DESCRIPTION

The following description with reference to the accompanying drawings is provided to help comprehensively understand the embodiments of the present disclosure defined by claims and their equivalents. Various specific details are included to help understanding, but these details are only to be regarded as exemplary. Therefore, those of ordinary skill in the art will recognize that various changes and modifications may be made to the embodiments described herein without departing from the scope and spirit of the present disclosure. In addition, for clarity and conciseness, the descriptions of well-known functions and structures may be omitted.

An existing booting process of a device such as an embedded device usually includes three processes: a running process of Boot Loader codes, a running process of a Hypervisor, and a booting process of a kernel of an operating system.

Among them, Boot Loader codes are a program that needs to be run before the Hypervisor and the kernel of the operating system are run.

The Hypervisor is an intermediate software layer that runs between basic physical hardware and the operating system, and which may allow multiple operating systems and applications to share hardware.

The booting process of the kernel of the operating system may include a single-core initialization phase and a multi-core initialization phase. In the single-core initialization phase, initialization of basic content required for operation of the operating system is performed. For example, initialization of a memory, initialization of a clock, and initialization of an interrupt may be performed in the single-core initialization phase. In the multi-core initialization phase, initialization of a device driver required for operation of the operating system is performed. For example, initialization of a graphics processor, initialization of a display processor, and initialization of a temperature monitoring processor may be performed in the multi-core initialization phase. Existing devices may be configured with multiple processors. Conventionally, in the single-core initialization phase of the kernel of the operating system, only one processor is in a working state, and the other processors are in a non-working state. Therefore, all tasks of the kernel in the single-core initialization phase are serially performed by the one processor, which causes the single-core initialization phase to take a relatively long time even though the time for the single-core initialization phase occupies only a small proportion in the overall booting time of the kernel of the operating system. However, the inventors of the subject matter described herein found that as hardware resources of the device become more abundant, the absolute time for the single-core initialization phase also increases. Therefore, if the time of the single-core initialization phase can be shortened, the booting time of the device may also be significantly shortened.

In view of the above problem, for optimizing the existing booting process of the kernel of the operating system, a booting method of a device is provided by exemplary embodiments of the present disclosure. More specifically, the booting method of a device may optimize the single-core initialization phase of the kernel of the operating system. The booting time of the kernel of the operating system of the device may be shortened by shortening the time of the single-core initialization phase of the kernel of the operating system, thereby achieving the purpose of shortening the booting time of the device.

The exemplary embodiments of the present disclosure also provide a Hypervisor-assisted Parallel Boot (HPB) architecture based on the device. The booting method of a device provided by the exemplary embodiments of the present disclosure may be performed based on this architecture.

Figure 1:
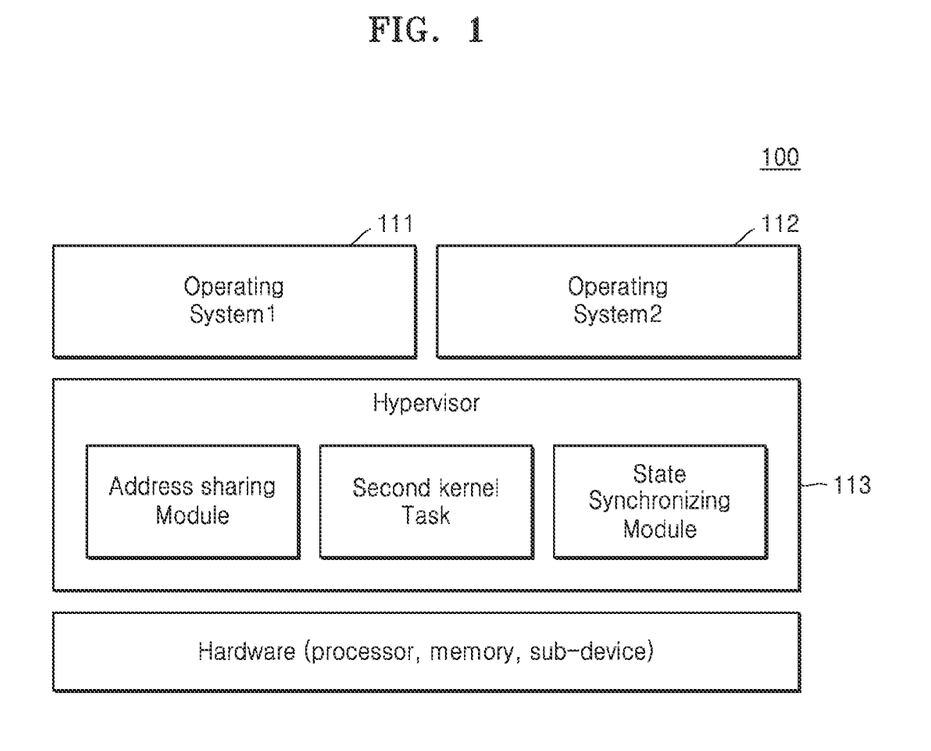
FIG. 1 is a schematic diagram illustrating a Hypervisor-assisted Parallel Boot architecture provided by an exemplary embodiment of the present disclosure.

FIG. 1 is a schematic diagram illustrating a Hypervisor-assisted Parallel Boot architecture of a device 100 provided by an exemplary embodiment of the present disclosure. Referring to FIG. 1, the architecture of the device 100 includes hardware, a Hypervisor 113, a first operating system 111 of the device 100 and a second operating system 112 of the device 100. The hardware may include one or more processor(s), a memory, and sub-devices of the device 100 such as a display, a speaker, a camera, and the like.

It should be noted here that the device 100 provided by the exemplary embodiments based on FIG. 1 is configured with at least two processors. For example, the device 100 may include four processors, which are a first processor 101, a second processor 102, a third processor 103, and a fourth processor 104, respectively. The four processors may be physically separate from one another in the device 100, and may be functionally independent from one another.

In the exemplary embodiments based on FIG. 1, the Hypervisor 113 may include an address sharing module and a state synchronizing module. In the exemplary embodiments based on FIG. 1, some processors may seamlessly access an address space of a kernel of one of the operating systems of the device 100 in the Hypervisor 113 through the address sharing module, thereby efficiently performing kernel tasks of the kernel of the operating system. The kernel tasks described herein may include processes and/or functions that are performed in order to implement and complete the initialization phase of kernel of the operating system of the device 100. Some processors may update a state of one kernel task of the kernel of the operating system after completing the one kernel task. For example, some processors may change the state of the kernel task to a completed state, and the state synchronizing module may synchronize the updated state of the kernel task to the kernel of the operating system.

The Hypervisor 113 also stores a part of the kernel tasks of the kernel of the operating system. For example, during a compilation phase of the operating system (OS), entry address information, priority information and the like of the part of the kernel tasks of the kernel of the operating system may be injected into the Hypervisor 113.

The device 100 provided by the exemplary embodiments based on FIG. 1 may be deployed with one operating system or at least two operating systems. For example, the device 100 in FIG. 1 is deployed with a first operating system 111 and a second operating system 112. The types of the operating systems deployed in the device 100 may include a Linux system, a Windows system, an IOS system, an Android system, etc. When multiple operating systems are deployed in the device 100, at least one item of types, versions, functions, and security levels of the multiple operating systems may be different. For example, the first operating system 111 may be the Linux system, and the second operating system 112 may be the Windows system.

For the sake of simplicity, an operating system with a kernel booting process that needs to be optimized by the booting method of the device 100 provided by the present disclosure is referred to as a preset operating system in the present disclosure. The device 100 may include one or more preset operating systems. For example, referring to FIG. 1, the first operating system 111 of the device 100 is the preset operating system, or the first operating system 111 and the second operating system 112 of the device 100 are both the preset operating systems. Further, the present disclosure distinguishes at least part of the processors in the device 100 in names based on their functions, according to the preset operating system, and the at least part of the processors may be referred to as a boot processor and a secondary processor, where the boot processor boots the preset operating system. Conventionally, in the single-core initialization phase of the kernel of the operating system, only the boot processor is in the working state to boot the preset operating system, and the other processors are in the non-working state.

In the exemplary embodiments based on FIG. 1, a part of the processors in the device 100 excluding the boot processor may be used as the secondary processors, or all the processors in the device 100 excluding the boot processor may be used as the secondary processors.

Figure 2:
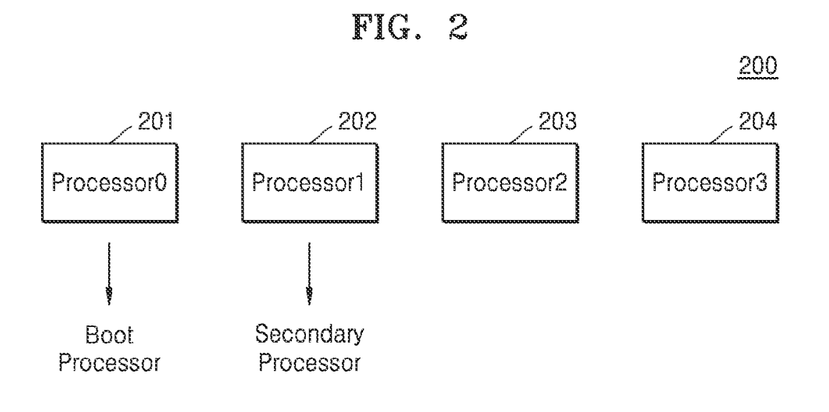
FIG. 2 is a schematic diagram illustrating a division of a boot processor and a secondary processor provided by an exemplary embodiment of the present disclosure.
Figure 3:
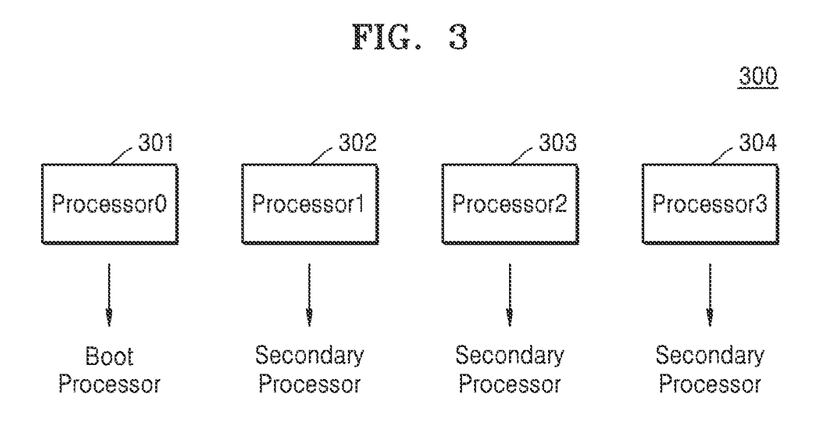
FIG. 3 is a schematic diagram illustrating another division of a boot processor and a secondary processor provided by an exemplary embodiment of the present disclosure.
Figure 4:
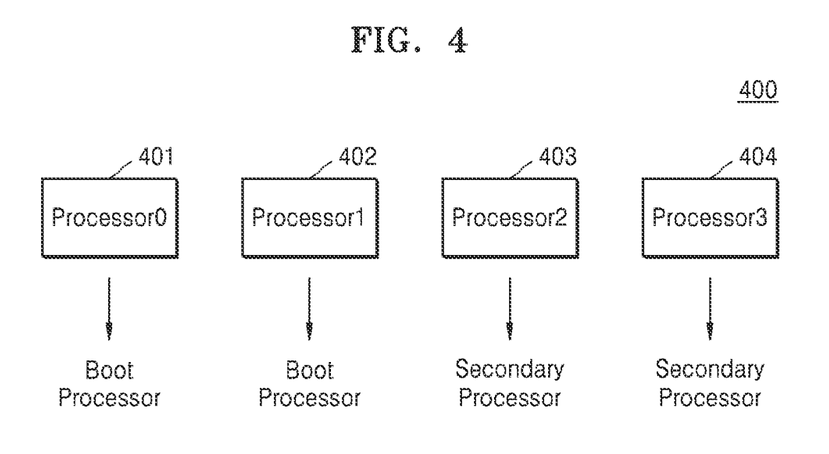
FIG. 4 is a schematic diagram illustrating another division of a boot processor and a secondary processor provided by an exemplary embodiment of the present disclosure.

FIG. 2, FIG. 3, and FIG. 4 respectively show three schematic diagrams of division of a boot processor and a secondary processor provided by exemplary embodiments of the present disclosure.

In FIG. 2, a device 200 includes a first processor 201, a second processor 202, a third processor 203, and a fourth processor 204. In FIG. 3, a device 300 includes a first processor 301, a second processor 302, a third processor 303, and a fourth processor 304. In FIG. 4, a device 400 includes a first processor 401, a second processor 402, a third processor 403, and a fourth processor 404.

Referring to FIG. 2 and FIG. 3, assuming that the first operating system 111 in the device is the preset operating system, and the first processor 201 runs the first operating system 111, the first processor 201 is the main processor which is used typically as the boot processor. At least one of the second processor 202 to the fourth processor 204 in FIG. 2 or the second processor 302 to the fourth processor 304 in FIG. 3 is the secondary processor. For example, referring to FIG. 2, the second processor 202 is used as the secondary processor. Referring to FIG. 3, the second processor 302, the third processor 303 and the fourth processor 304 are all used as the secondary processors.

Referring to FIG. 4, the first operating system 111 and the second operating system 112 in the device 400 are both the preset operating systems. The first processor 401 runs the first operating system 111, and the second processor 402 runs the second operating system 112, then the first processor 401 and the second processor 402 are respectively the main processors of the first operating system 111 which is preset and the second operating system 112 which is preset. That is, the first processor 401 and the second processor 402 may be used as boot processor. At least one of the third processor 403 and the fourth processor 404 is the secondary processor. For example, the third processor 403 may be used as the secondary processor, or referring to FIG. 4, both the third processor 403 and the fourth processor 404 are used as the secondary processors.

Figure 5:
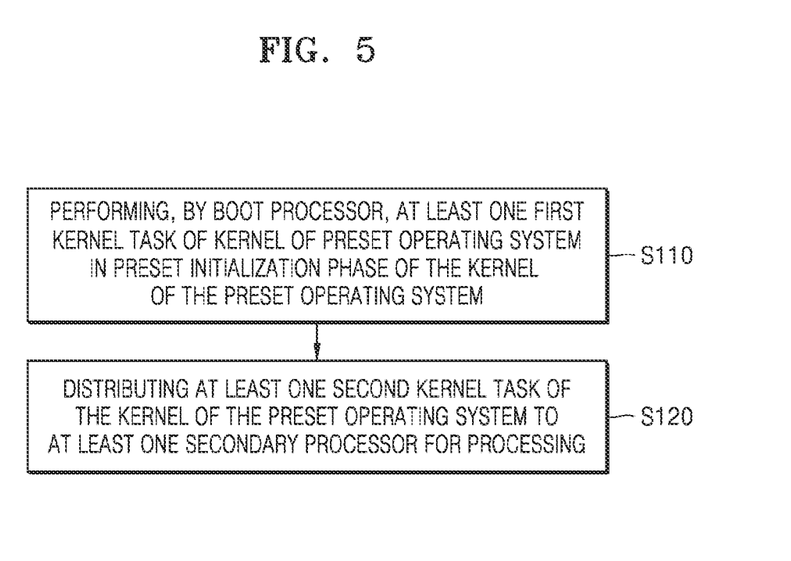
FIG. 5 is a flowchart illustrating a booting method of a device provided by an exemplary embodiment of the present disclosure.

FIG. 5 is a flowchart illustrating a booting method of a device provided by an exemplary embodiment of the present disclosure.

Referring to FIG. 5, the booting method of the device includes step S110 of performing, by a main processor (i.e., a boot processor), at least one first kernel task of a kernel of a preset operating system in a preset initialization phase of the kernel of the preset operating system. At step S120 of FIG. 5, the method includes distributing at least one second kernel task of the kernel of the preset operating system to at least one secondary processor for processing.

It can be understood that both the boot processor and the secondary processor may be processors of the device, and the boot processor may boot the preset operating system. In the preset initialization phase, tasks of the kernel of the preset operating system may be pre-divided into the at least one first kernel task and the at least one second kernel task.

It should be noted here that the "pre-divide" may be implemented in a variety of available ways. For example, in a kernel task development phase, a kernel developer may choose to use developed task codes that do not depend on other tasks of the kernel during the running process as the second kernel task, and the second kernel task may be marked as an HPB task. Task codes that depend on other tasks of the kernel during the running process may be used as the first kernel tasks. Remaining task codes may be used as the second kernel tasks. The first kernel task(s) is/are not marked as the HPB task(s) and the second kernel task(s) is/are marked as the HPB task(s).

In some embodiments, task code may still be marked as an HPB task even though they depend on other tasks of the kernel. These types of task codes may wait until dependent tasks are completed before a distribution instruction is triggered so that these task codes are distributed to a secondary processor for processing.

According to circumstances, multiple kernel tasks may need to be performed in the preset initialization phase of the kernel of the preset operating system. As described above, the booting method of the device provided by the exemplary embodiments of the present disclosure is used to optimize the existing single-core initialization phase of the kernel of the operating system. The kernel tasks of the preset initialization phase of the kernel of the operating system according to the present disclosure are the same as kernel tasks of the single-core initialization phase when the kernel of the preset operating system is booted conventionally, whereas the kernel tasks may be processed differently according to the present disclosure As an example, the kernel of the preset operating system in step S110 may be a Linux kernel of a version 4.0. In some exemplary embodiments of the present disclosure, kernel tasks in the preset initialization phase of the Linux kernel of the version 4.0 are the same as kernel tasks of the single-core initialization phase when the Linux kernel of the version 4.0 is booted conventionally. For example, when the Linux kernel of the version 4.0 is booted conventionally, the kernel tasks in the single-core initialization phase include a task 1, a task 2, a task 3, and a task 4. Then, in these exemplary embodiments of the present disclosure, the kernel tasks in the preset initialization phase of the Linux kernel of the version 4.0 also include the task 1, the task 2, the task 3, and the task 4. As an example, the kernel tasks in the preset initialization phase of the Linux kernel may include initializing a memory, establishing a page table, and the like. As an example of the "pre-divide", the task 1 and the task 2 may be regarded as first kernel tasks, and the task 3 and the task 4 may be regarded as second kernel tasks. Among them, the boot processor may perform the first kernel tasks, and distribute the second kernel tasks to the secondary processors by means of a hypervisor layer, and the secondary processors perform the second kernel tasks. The number and types of the first kernel tasks and the second kernel tasks may be preset according to actual needs.

In step S120, if the secondary processor is not currently performing the second kernel task, when the secondary processor receives a new second kernel task, the secondary processor may immediately perform the new second kernel task. The remaining processors that have not received the new second kernel task may remain in a non-working state, or continue to perform the second kernel task received before.

According to the booting method of the device provided by the present disclosure, the kernel tasks of the preset initialization phase of the kernel of the preset operating system are divided into the first kernel task(s) performed by the boot processor and the second kernel task(s) performed by the secondary processor. The boot processor and the at least one secondary processor may perform multiple kernel tasks in the preset initialization phase in parallel, which shortens the time of the preset initialization phase and speeds up the booting process of the kernel of the operating system. Compared with the conventional booting, the booting time of the device is shortened and the device may be booted more quickly.

Alternatively, in step S120, the distributing the at least one second kernel task of the kernel of the preset operating system to the at least one secondary processor for processing may include switching, by the main processor (i.e., the boot processor), to run in a Hypervisor state and distributing the at least one second kernel task to the at least one secondary processor in the Hypervisor state for processing.

In the Hypervisor-assisted Parallel Boot architecture shown in FIG. 1, the boot processor and/or the secondary processor may adopt an ARM-v8 architecture. The processor of the ARM-v8 architecture includes four exception levels (EL), which are respectively an EL0 to an EL3. Among them, the applications run on the EL0, the kernel of the operating system runs on the EL1 the Hypervisor 113 runs on the EL2, and the secure monitor (SM) runs on the EL3.

It should be noted here that a certain processor (for example, the boot processor and/or the secondary processor) may only be in one EL at the same time. Before the preset operating system is booted, only the boot processor is in the EL1 (operating system (OS) state), while other secondary processors are in the EL2 (Hypervisor state); in the preset initialization phase when the preset operating system is booted, the boot processor may enter the EL2 from the EL1 in response to triggering a distribution instruction, which achieves the above step of "switching, by the main processor, to run in the Hypervisor state".

Figure 6:
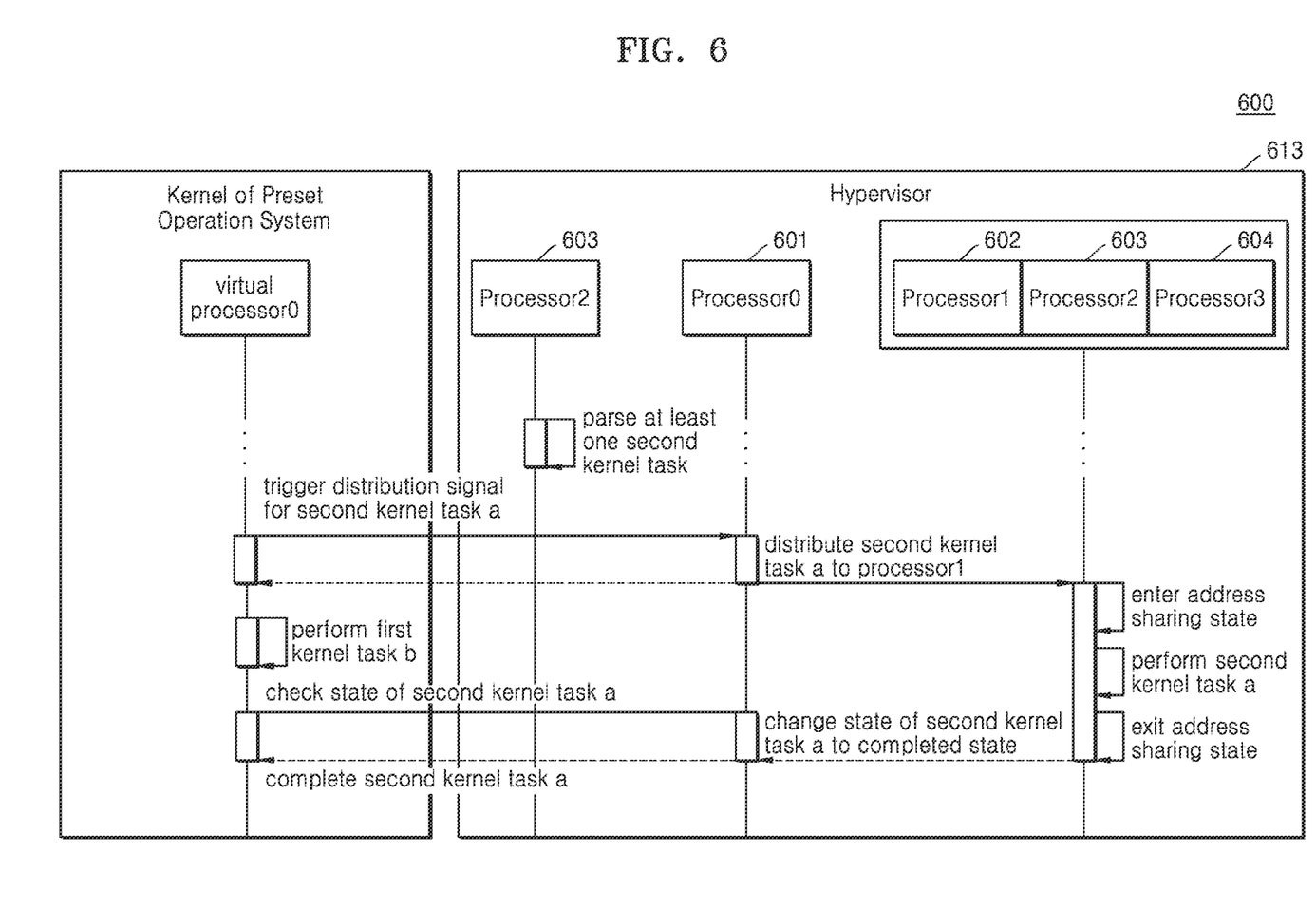
FIG. 6 is a schematic flowchart illustrating a booting method of a device in a specific scenario according to an exemplary embodiment of the present disclosure.

In some exemplary embodiments of the present disclosure, the boot processor may call an HVC instruction to trap to the Hypervisor state of EL2. The HVC instruction serves as the basis of a Hypervisor Call exception, by which the processor mode changes to the Hypervisor state of EL2 in the ARM-v8 architecture. Referring to FIG. 6, the boot processor in the OS state of EL1 may be a virtual processor 0 running on a physical processor 0. The virtual processor 0 traps from the OS state (EL1) to the Hypervisor state (EL2) in response to triggering a distribution instruction for the second kernel task, and the virtual processor 0 becomes a processor 0.

It should be understood that the boot processor may distribute the second kernel tasks based on a preset rule. That is, the boot processor may determine which second kernel tasks may currently be distributed and determine which secondary processors will receive the second kernel tasks, based on the preset rule. The implementation processes of how the boot processor determines the second kernel tasks that may be distributed currently and determines the secondary processors that will receive the second kernel tasks will be introduced below.

As mentioned above, the first kernel task and the second kernel task of the preset initialization phase of the kernel of the preset operating system are pre-divided. The second kernel task is separated from the kernel of the preset operating system. The second kernel task may refer to a kernel task that may be performed without depending on results of performing other kernel tasks.

In some exemplary embodiments of the present disclosure, characteristic information of the second kernel task may be injected into the Hypervisor 113 of the device during the compilation phase of the preset operating system. Therefore, the Hypervisor may store the characteristic information of at least one second kernel task. The characteristic information may include priority information of the second kernel task. Further, the Hypervisor may be used to analyze the characteristic information of the at least one second kernel task to obtain the priority information of the at least one second kernel task.

In this embodiment, the characteristic information may be obtained in any suitable way. For example, during the booting phase of the Hypervisor 113, a specified processor in the Hypervisor 113 parses at least one second kernel task to obtain the characteristic information of each second kernel task. It should be understood that the booting phase of the Hypervisor 113 may occur before the preset initialization phase of the kernel of the preset operating system. That is, the specified processor may parse the second kernel task before the preset initialization phase of the kernel of the preset operating system. The specified processor may store the characteristic information of each second kernel task in a preset task list. Each processor in the device, such as the boot processor and the secondary processor, may obtain the characteristic information of each second kernel task from the task list. Alternatively, the specified processor may be used to further analyze the characteristic information to obtain the priority information of the second kernel task.

Herein, the specified processor may be a pre-selected processor among all processors of the device. For example, the specified processor may be the above boot processor or secondary processor, or other processors excluding the boot processor and the secondary processor.

In step S120, the distributing the at least one second kernel task of the kernel of the preset operating system to the at least one secondary processor for processing may include distributing, by the boot processor according to the priority information of the at least one second kernel task, the at least one second kernel task to the at least one secondary processor for processing.

It should be understood that the boot processor may determine at least one second kernel task with the current highest priority among all currently unperformed kernel tasks based on the priority information of each second kernel task. The determined second kernel task with the current highest priority is the second kernel task that may be distributed currently.

It should be noted here that all the currently unperformed kernel tasks include the first kernel task that is not currently performed and the second kernel task that is not currently performed. It can be understood that since the priorities of multiple kernel tasks may be the same, the boot processor may determine at least one second kernel task with the current highest priority at a time, and distribute the determined at least one second kernel task with the current highest priority to the at least one secondary processor.

According to the booting method of the device provided by the present disclosure, an order of performing each second kernel task may be determined according to the priorities of the second kernel tasks, so as to avoid a second kernel task with low-priority to be performed before a second kernel task with high-priority and ensure that the second kernel task with high-priority may be performed first.

In some exemplary embodiments of the present disclosure, the order of performing each second kernel task may be determined according to the priorities of the second kernel tasks. Specifically, the boot processor may distribute each second kernel task to at least one secondary processor in the order from high priority to low priority.

In some exemplary embodiments of the present disclosure, processes of some second kernel tasks may depend on results of performing other kernel tasks, while processes of other some second kernel tasks (such as initialization task of a certain IO device) do not depend on the results of performing the other kernel tasks.

For the second kernel task with a process that depends on the results of performing other kernel tasks, the second kernel task may start to be performed only when the processes of the other kernel tasks on which the second kernel task depends are completed. The other kernel tasks may be first kernel tasks or second kernel tasks.

Alternatively, the step of distributing the at least one second kernel task of the kernel of the preset operating system to the at least one secondary processor for processing may include: receiving, by the main processor (i.e., the boot processor), at least one distribution trigger signal, and distributing the second kernel task corresponding to the at least one distribution trigger signal to the at least one secondary processor.

The second kernel task corresponding to the at least one distribution trigger signal is the second kernel task with a process that depends on the results of performing other kernel tasks as described above. When the process(es) of other kernel tasks on which the second kernel task depends is completed, the system kernel may transmit the distribution trigger signal for the second kernel task to the main processor (i.e., the boot processor). After the boot processor receives the distribution trigger signal, the boot processor may indicate that the second kernel task is the second kernel task that may be distributed currently, such that the second kernel task is distributed to the secondary processor to enable the second kernel task to be performed by the secondary processor.

Alternatively, in step S120, after processing the at least one second kernel task by the secondary processor, the method may further include: updating, by the secondary processor, a state of the second kernel task to a completed state.

After the secondary processor completes one second kernel task, the secondary processor may change a state of the second kernel task to a completed state in the Hypervisor 113 through the Hypervisor 113. Specifically, the Hypervisor 113 may include a state synchronizing module. After the secondary processor completes one second kernel task, the secondary processor may change the state of the second kernel task to the completed state in the Hypervisor 113, and synchronize the state to the operating system through the state synchronizing module.

As mentioned above, the processes of some second kernel tasks (for example, the task 3) may depend on the results of performing other kernel tasks (for example, the task 4). Taking the other kernel tasks as the second kernel task as an example, after the secondary processor completes the performing of the task 4, the secondary processor may change the state of the task 4 to the completed state in the Hypervisor 113 through the state synchronizing module. At this time, the kernel of the operating system may determine that the performing of the task 4 has been completed and transmit the distribution trigger signal for the task 3 to the boot processor such that the boot processor distributes the task 3 to the secondary processor.

Alternatively, the step of distributing the at least one second kernel task of the kernel of the preset operating system to the at least one secondary processor to perform processing may include: determining, by the main processor (i.e., the boot processor), the second kernel task with a designated identifier (for example, the HPB mark described in the foregoing section), and distributing the second kernel task with the designated identifier to the at least one secondary processor.

The designated identifier of the second kernel task may be used to indicate that the process of the second kernel task does not depend on the results of performing other kernel tasks.

For the second kernel task with a process that does not depend on the results of performing other kernel tasks, the second kernel task may be marked with the designated identifier in advance. When the boot processor determines that a second kernel task has a designated identifier, the boot processor may indicate that the second kernel task is the second kernel task that may be distributed currently, so that the second kernel task with the designated identifier is distributed to the at least one secondary processor.

Alternatively, the foregoing ways for determining the second kernel task that may be distributed currently may be combined to obtain more ways for the second kernel task that may be distributed currently.

As an example, the boot processor may determine the second kernel task with the current highest priority among all currently unperformed kernel tasks, and when receiving a distribution trigger signal for the second kernel task with the current highest priority, may determine the second kernel task with the current highest priority corresponding to the distribution trigger signal is the second kernel task that may be distributed currently, and may distribute the second kernel task that may be distributed currently to the secondary processor.

As an example, the boot processor may determine the second kernel task with the current highest priority among all currently unperformed kernel tasks, and when determining that the second kernel task with the highest current priority has a designated identifier, determine the second kernel task with the current highest priority and the designated identifier is the second kernel task that may be distributed currently, and distribute the second kernel task that may be distributed currently to the secondary processor.

Alternatively, the step of distributing the at least one second kernel task of the kernel of the preset operating system to the at least one secondary processor for processing may include: distributing the at least one second kernel task of the kernel of the preset operating system to the at least one secondary processor in an idle state.

It should be noted here that the secondary processor is in the idle state when the secondary processor does not perform the second kernel task, and when the secondary processor completes one second kernel task, the secondary processor may enter the idle state again. The boot processor may distribute the second kernel task to the secondary processor in the idle state, and the second kernel task may be immediately performed by the secondary processor in the idle state, thus making full use of the resources of the secondary processors and helping to improve the performing speed of the second kernel task.

Alternatively, the boot processor may determine at least one second kernel task that may be distributed currently, and distribute the at least one second kernel task that may be distributed currently to at least one secondary processor in an idle state.

When the number of second kernel tasks that may be distributed currently determined by the boot processor is less than or equal to that of the secondary processors in the idle state, each second kernel task may be transmitted to different secondary processors in the idle state, so that each second kernel task may be immediately performed by the corresponding secondary processor, thereby improving the performing speed of the second kernel tasks.

When the number of second kernel tasks that may be distributed currently determined by the boot processor is greater than that of the secondary processors in the idle state, one second kernel task that may be distributed currently may be distributed to each secondary processor in the idle state, so that each secondary processor in the idle state may be assigned a second kernel task, thereby fully increasing the resources of the secondary processors. The second kernel tasks that have not been distributed among the second kernel tasks that may be distributed currently, may be distributed to at least one secondary processor that enters the idle state immediately after the secondary processor enters the idle state.

In some exemplary embodiments of the present disclosure, the characteristic information may further include entry address information of the second kernel task; in step S120, the processing the at least one second kernel task by the secondary processor may include accessing an entry address of the second kernel task and performing the second kernel task by the secondary processor according to the entry address of the second kernel task and address sharing information. The address sharing information may include an address translation table of the preset operating system.

As can be understood, the secondary processors located in the Hypervisor 113 may share the address translation table of the operating system based on the address sharing module, so that the task data of the distributed second kernel task may be accessed through the entry address, and the second kernel task may be performed, thus greatly reducing the time consumption caused by accessing the entry address. Specifically, the Hypervisor 113 may include the address sharing module. The secondary processor enters the address sharing state after receiving the second kernel task distributed by the main processor (i.e., the boot processor). When the secondary processor is in the address sharing state, the secondary processor may access the entry address of the distributed second kernel task in the Hypervisor 113 through the address sharing module based on the entry address information of the distributed second kernel task, thereby performing the distributed second kernel task.

FIG. 6 is a schematic flowchart illustrating a booting method of a device in a specific scenario according to an exemplary embodiment of the present disclosure.

Referring to FIG. 6, the device includes a virtual processor 0, a first processor 601, a second processor 602, a third processor 603, and a fourth processor 604. The virtual processor 0 in FIG. 6 is a boot processor running in an operating system state. The first processor 601 in FIG. 6 is a boot processor running in a Hypervisor state. The third processor 603 in FIG. 6 includes a processor for parsing a second kernel task (that is, the specified processor as described above) and is and serves as a secondary processor for performing the second kernel task. Both the second processor 602 and the fourth processor 604 are secondary processors.

A preset initialization phase of a kernel of a preset operating system includes a second kernel task a, a second kernel task d, a first kernel task b, and a first kernel task c. The process of the second kernel task a depends on a result of performing the second kernel task d.

Referring to FIG. 6, the third processor 603 is located on the left side of the first processor 601 in the figure, as the specified processor. The third processor 603 parses at least one second kernel task in the Hypervisor 613 to obtain characteristic information of each second kernel task.

Next, the virtual processor 0 triggers a distribution instruction for second kernel task a, and traps from the operating system state (EL1) to the Hypervisor state (EL2), and switches to the first processor 601.

If the first processor 601 determines that the second kernel task a is the second kernel task with the current highest priority among all the currently unperformed second kernel tasks, and the second processor 602 is in an idle state, then the processor 0 distributes the second kernel task a to the second processor 602.

Next, the first processor 601 returns to the operating system state (EL1) from the Hypervisor state (EL2), switches to the virtual processor 0, and performs the first kernel task b.

Next, after the second processor 602 receives the second kernel task a distributed by the first processor 601, the second processor 602 enters an address sharing state. When the second processor 602 is in the address sharing state, the second processor 602 may access an entry address of the second kernel task a in the Hypervisor 613 through an address sharing module, so as to perform the distributed second kernel task a.

Next, the second processor 602 exits the address sharing state after completing the second kernel task a. The second processor 602 changes the state of the second kernel task a to a completed state in the Hypervisor 613 through a state synchronizing module.

During performance of the above steps, the kernel of the preset operating system may check the state of the second kernel task. In response to the state of the second kernel task a being changed to a completed state, the first processor 601 feeds back the state of the second kernel task a to the kernel of the preset operating system.

In the foregoing process of the booting method of the device, when the virtual processor 0 performs the first kernel task b, the second processor 602 may perform the second kernel task a in parallel. It can be seen that the process may make full use of resources of idle processors, shorten the time of the preset initialization phase, and speeds up the booting process of the kernel of the operating system. Compared with the conventional booting, the booting time of the device 600 is further shortened, so that the device 600 may be booted more quickly.

The device provided by the exemplary embodiments of the present disclosure is deployed with a preset operating system. The device includes a boot processor and at least one secondary processor. The boot processor is configured to boot the preset operating system, perform at least one first kernel task of a kernel of the preset operating system in a preset initialization phase of the kernel of the preset operating system, and distribute at least one second kernel task of the kernel of the preset operating system to at least one secondary processor for processing. Tasks of the kernel of the preset operating system in the preset initialization phase are divided into the at least one first kernel task and the at least one second kernel task.

Alternatively, the boot processor may be configured to switch to run in a Hypervisor state, and distribute the at least one second kernel task to the at least one secondary processor in the Hypervisor state for processing.

Alternatively, the Hypervisor 613 may store characteristic information of the at least one second kernel task. The characteristic information may include priority information of the at least one second kernel task. The Hypervisor 613 may parse the characteristic information of the at least one second kernel task to obtain the priority information of the at least one second kernel task. The boot processor may be further configured to distribute, according to the priority information of the at least one second kernel task, the at least one second kernel task to the at least one secondary processor for processing.

Alternatively, the characteristic information may further include entry address information of the second kernel task. The secondary processor may be configured to access an entry address of the second kernel task and perform the second kernel task according to the entry address of the second kernel task and address sharing information. The address sharing information may include an address translation table of the preset operating system.

Alternatively, the secondary processor may be configured to update a state of the second kernel task to a completed state.

Alternatively, the boot processor may be configured to call an HVC instruction to trap to the Hypervisor state.

According to the device provided by the present disclosure, the boot processor may distribute the second kernel task to the secondary processor in the idle state, and the second kernel task may be immediately performed by the secondary processor in the idle state, which makes full use of the resources of the secondary processor and helps to improve the performing speed of the second kernel task.

It can be understood that the boot processor and the secondary processor may also be used to perform additional steps in addition to the above steps or perform more specific processing when performing the above steps. The content of these additional steps and further processing has been mentioned in the description of the related method with reference to FIG. 1 and other figures herein, thus it will not be repeated here.

It can be understood that the device further includes a memory, and the boot processor and the at least one secondary processor may run instructions or codes stored in the memory to cause the boot processor and the at least one secondary processor to perform the corresponding steps of the booting method of the device.

The memory may also store data. Instructions and data may also be transmitted and received through a network via a network interface device, where the network interface device may use any known transmission protocol.

The memory may be integrated with a processor. For example, RAM or flash memory may be arranged in (e.g., integrated with) an integrated circuit microprocessor or the like. In addition, the memory may include a separate device, such as an external disk drive, storage array, or any other storage device that may be used by a database system. The memory and the processor may be operatively coupled, or may communicate with each other, for example, through an I/O port, a network connection, or the like, so that the processor may read files stored in the memory.

In addition, the device may also include a video display such as a liquid crystal display, a user interaction interface such as a keyboard, a mouse, and/or a touch input device, etc. The device may also include a speaker, a camera, and the like. All components of the device may be connected to each other via a bus and/or network.

According to the booting method of the device provided by the present disclosure, the kernel tasks of the preset initialization phase of the kernel of the preset operating system are divided into first kernel tasks performed by the boot processor and second kernel tasks performed by the secondary processor. The boot processor and the at least one secondary processor may perform multiple kernel tasks in the preset initialization phase in parallel, which shortens the time of the preset initialization phase and speeds up the booting process of the kernel of the operating system. Accordingly, the booting time of the device is shortened compared with conventional booting, so that the device may be booted more quickly.

In addition, the booting method of the device described with reference to FIG. 1 and other FIGs. herein may be implemented by a program (or instruction) recorded on a computer-readable storage medium. For example, according to the exemplary embodiments of the present disclosure, a computer-readable storage medium storing instructions may be provided. The instructions, when executed by a boot processor and at least one secondary processor, cause the boot processor and the at least one secondary processor to respectively perform the corresponding steps of booting methods of the device described herein.

The computer programs in the above computer-readable storage medium may be executed in an environment deployed in computer equipment such as a client, a host, an agent device, and a server. The computer programs may also be used to perform additional steps excluding the above steps or perform more specific processing when the above steps are performed. These additional steps and more specific processing have been mentioned in the description of the related method with reference to FIG. 1 and other FIGs. herein, thus details will not be repeated here to avoid repetition.

The exemplary embodiments of the present disclosure have been described above, and it should be understood that the foregoing description is only exemplary and not exhaustive, and the present disclosure is not limited to the disclosed exemplary embodiments. Many modifications and alterations are obvious to those of ordinary skill in the art without departing from the scope and spirit of the present disclosure. Therefore, the protection scope of the present disclosure should be subject to the scope of the claims.

What is claimed is:

1. A booting method of a device deployed with a preset operating system, the booting method comprising:
    performing, by a main processor, at least one first kernel task of a kernel of the preset operating system in a preset initialization phase of the kernel of the preset operating system;
    storing, by a Hypervisor of the device, characteristic information of at least one second kernel task; and
    distributing, based on the characteristic information of the at least one second kernel task, the at least one second kernel task of the kernel of the preset operating system to at least one secondary processor for processing,
    wherein the main processor and the secondary processor are both processors of the device, the main processor boots the preset operating system, and tasks of the kernel of the preset operating system in the preset initialization phase are divided into the at least one first kernel task and the at least one second kernel task.

2. The booting method of claim 1, wherein distributing at least one second kernel task of the kernel of the preset operating system to the at least one secondary processor for processing comprises:
   switching, by the main processor, to run in a Hypervisor state and distributing the at least one second kernel task to the at least one secondary processor in the Hypervisor state for processing.

3. The booting method of claim 2, further comprising:
   parsing, by the Hypervisor, the characteristic information of the at least one second kernel task to obtain priority information of the at least one second kernel task from the characteristic information,
   wherein distributing at least one second kernel task of the kernel of the preset operating system to the at least one secondary processor for processing comprises distributing, by the main processor according to the priority information of the at least one second kernel task, the at least one second kernel task to the at least one secondary processor for processing.

4. The booting method of claim 2, wherein switching, by the main processor, to run in a Hypervisor state comprises:
   calling, by the main processor, a Hypervisor call (HVC) instruction to trap to the Hypervisor state.

5. The booting method of claim 1, wherein the characteristic information further comprises entry address information of the second kernel task,
   wherein processing the at least one second kernel task by the secondary processor comprises accessing an entry address of the second kernel task and performing the second kernel task by the secondary processor according to the entry address of the second kernel task and address sharing information,
   wherein the address sharing information comprises an address translation table of the preset operating system.

6. The booting method of claim 1, wherein after processing the at least one second kernel task by the secondary processor, the method further comprises: updating, by the secondary processor, a state of the second kernel task to a completed state.

7. A device deployed with a preset operating system, comprising:
   a boot processor; and
   at least one secondary processor,
   wherein the boot processor is configured to:
      perform at least one first kernel task of a kernel of the preset operating system in a preset initialization phase of the kernel of the preset operating system,
      store, when running in a Hypervisor state of the boot processor, characteristic information of at least one second kernel task, and
      distribute, based on the characteristic information of the at least one second kernel task, the at least one second kernel task of the kernel of the preset operating system to at least one secondary processor for processing,
      wherein tasks of the kernel of the preset operating system in the preset initialization phase are divided into the at least one first kernel task and the at least one second kernel task.

8. The device of claim 7, wherein the boot processor is configured to:
   switch to run in the Hypervisor state, and
   distribute the at least one second kernel task to the at least one secondary processor in the Hypervisor state for processing.

9. The device of claim 8,
   wherein, when running in the Hypervisor state, the boot processor is configured to parse the characteristic information of the at least one second kernel task to obtain priority information of the at least one second kernel task from the characteristic information,
   wherein the boot processor is further configured to:
      distribute, according to the priority information of the at least one second kernel task, the at least one second kernel task to the at least one secondary processor for processing.

10. The device of claim 8, wherein the boot processor is configured to call a Hypervisor call (HVC) instruction to trap to the Hypervisor state.

11. The device of claim 7,
    wherein the characteristic information further comprises entry address information of the second kernel task,
    wherein the secondary processor is configured to access an entry address of the second kernel task and perform the second kernel task according to the entry address of the second kernel task and address sharing information, and
    wherein the address sharing information comprises an address translation table of the preset operating system.

12. The device of claim 7, wherein the secondary processor is configured to update a state of the second kernel task to a completed state.

13. A non-transitory computer-readable storage medium storing instructions, wherein the instructions, when executed by a boot processor of a device with a preset operating system, cause the boot processor to:
    perform at least one first kernel task of a kernel of the preset operating system in a preset initialization phase of the kernel of the preset operating system;
    store, by a Hypervisor of the device, characteristic information of at least one second kernel task; and
    distribute, based on the characteristic information of the at least one second kernel task, at least one second kernel task of the kernel of the preset operating system to at least one secondary processor for processing,
    wherein the boot processor and the secondary processor are both processors of the device, the boot processor boots the preset operating system, and tasks of the kernel of the preset operating system in the preset initialization phase are divided into the at least one first kernel task and the at least one second kernel task.

14. The non-transitory computer-readable storage medium of claim 13, wherein distributing at least one second kernel task of the kernel of the preset operating system to the at least one secondary processor for processing comprises:
    switching, by the boot processor, to run in a Hypervisor state and distributing the at least one second kernel task to the at least one secondary processor in the Hypervisor state for processing.

15. The non-transitory computer-readable storage medium of claim 14, wherein the instructions, when executed by the boot processor, further cause the boot processor to
    parse, by the Hypervisor, the characteristic information of the at least one second kernel task to obtain priority information of the at least one second kernel task from the characteristic information, and
    wherein distributing at least one second kernel task of the kernel of the preset operating system to the at least one secondary processor for processing comprises:
       distributing, by the boot processor according to the priority information of the at least one second kernel task, the at least one second kernel task to the at least one secondary processor for processing.

16. The non-transitory computer-readable storage medium of claim 14, wherein switching, by the boot processor, to run in a Hypervisor state comprises:
   calling, by the boot processor, a Hypervisor call (HVC) instruction to trap to the Hypervisor state.

17. The non-transitory computer-readable storage medium of claim 13, wherein the characteristic information further comprises entry address information of the second kernel task,
   wherein processing the at least one second kernel task by the secondary processor comprises accessing an entry address of the second kernel task and performing the second kernel task by the secondary processor according to the entry address of the second kernel task and address sharing information, and
   wherein the address sharing information comprises an address translation table of the preset operating system.

18. The non-transitory computer-readable storage medium of claim 13, wherein the instructions further cause the secondary processor to update a state of the second kernel task to a completed state after processing the at least one second kernel task.

* * * * *